United States Patent

Paczkowski et al.

(10) Patent No.: US 9,485,241 B2
(45) Date of Patent: Nov. 1, 2016

(54) SECURE COMMUNICATION PATHS IN DATA NETWORKS WITH TETHERED DEVICES

(71) Applicant: Sprint Communications Company L.P., Overland Park, KS (US)

(72) Inventors: Lyle Walter Paczkowski, Mission Hills, KS (US); Mike L. McRoberts, Overland Park, KS (US); Thomas M. Renner, Overland Park, KS (US); Ivan Sheon Fenwick, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 61 days.

(21) Appl. No.: 14/550,344

(22) Filed: Nov. 21, 2014

(65) Prior Publication Data

US 2016/0149880 A1    May 26, 2016

(51) Int. Cl.
   *H04L 29/06* (2006.01)
   *H04L 12/723* (2013.01)
   *H04W 12/06* (2009.01)

(52) U.S. Cl.
   CPC ............. *H04L 63/08* (2013.01); *H04L 45/50* (2013.01); *H04L 63/0876* (2013.01); *H04L 63/101* (2013.01); *H04W 12/06* (2013.01)

(58) Field of Classification Search
   CPC ... H04L 63/08; H04L 45/50; H04L 63/0815; H04L 63/10; H04W 12/06
   USPC .......................................................... 726/4
   See application file for complete search history.

(56) References Cited

U.S. PATENT DOCUMENTS

| | | | |
|---|---|---|---|
| 8,494,576 B1 * | 7/2013 | Bye .................... | G07C 9/00087 455/403 |
| 8,504,097 B1 | 8/2013 | Cope et al. | |
| 8,625,788 B2 | 1/2014 | Pendakur et al. | |
| 8,649,770 B1 | 2/2014 | Cope et al. | |
| 8,667,607 B2 | 3/2014 | Paczkowski et al. | |
| 8,773,990 B1 | 7/2014 | Rasool et al. | |
| 8,819,447 B2 | 8/2014 | Shipley et al. | |
| 2007/0285258 A1 * | 12/2007 | Hartman ............ | G08B 21/0269 340/573.1 |
| 2010/0311401 A1 | 12/2010 | Oh et al. | |
| 2012/0240197 A1 * | 9/2012 | Tran .................... | H04L 63/1416 726/4 |
| 2013/0103819 A1 * | 4/2013 | Meyer ....................... | H04L 9/00 709/223 |
| 2013/0345530 A1 | 12/2013 | McRoberts et al. | |
| 2014/0033316 A1 | 1/2014 | Paczkowski et al. | |
| 2014/0047548 A1 | 2/2014 | Bye et al. | |
| 2014/0215557 A1 * | 7/2014 | Vishnubhatt ........ | H04L 63/0227 726/3 |

FOREIGN PATENT DOCUMENTS

EP         1517478         3/2005

* cited by examiner

Primary Examiner — William Goodchild

(57) ABSTRACT

A communication network processes intermediate security data from intermediate access nodes on a communication path between a network access node and an end-point device to determine if the intermediate access nodes are authorized. If the intermediate access nodes are authorized, then the network processes end-point security data from the end-point device to determine if the end-point device is authorized. If the end-point device is authorized, then the network processes end-point tethering data from the end-point device to determine if any tethered communication devices are coupled to the end-point device. If the end-point device is not coupled to any tethered communication devices, then the network authorizes a data transfer session for the end-point device over the communication path. If the end-point device is coupled to a tethered communication device, then the network denies authorization for the data transfer session over the communication path for the end-point device.

16 Claims, 9 Drawing Sheets

SECURE COMMUNICATION PATHS IN DATA NETWORKS WITH TETHERED DEVICES

TECHNICAL BACKGROUND

Computer and communication systems like phones and routers are equipped with open mode systems and secure mode systems. The open and secure mode systems maintain physical separation through separate circuitry, memory, processing times, processing contexts, and the like. The secure mode systems control the open mode systems by controlling open mode access to processors, transceivers, user interfaces, and memory. The secure mode systems federate with one another by using shared secret keys to exchange random numbers and hash results.

Computer and communication systems like phones and routers use Multi-Protocol Label Switching (MPLS) to efficiently exchange Internet Protocol (IP) data packets. MPLS systems add MPLS labels to the IP packets based on the IP addresses in the packets. After the first IP data packet is routed based on the IP addresses, then the MPLS routers efficiently route the remaining IP data packets over the same communication path based on the shorter MPLS label. MPLS systems use registration procedures before allowing end-point devices on the MPLS network.

Some end-point devices with MPLS access also allow other devices to tether and communicate through them over the MPLS network—possibly bypassing the proper registration procedures. Examples of tethered devices include memory sticks, phones, media players, and tablet computers. The tethered devices and the tethering host communicate with one another over tethering protocols, such as Universal Serial Bus (USB), Near Field Communication (NFC), Wireless Fidelity (WiFi), universal Plug and Play (uPnP), Ethernet, and Long Term Evolution (LTE). In some cases, the tethered devices pose a security threat. In other cases, the tethered devices are legitimate and necessary for optimal network operation. Unfortunately, the integration of secure mode systems with MPLS networks to provide secure access to tethering devices is not efficient or effective.

TECHNICAL OVERVIEW

A communication network processes intermediate security data from intermediate access nodes on a communication path between a network access node and an end-point device to determine if the intermediate access nodes are authorized. If the intermediate access nodes are authorized, then the network processes end-point security data from the end-point device to determine if the end-point device is authorized. If the end-point device is authorized, then the network processes end-point tethering data from the end-point device to determine if any tethered communication devices are coupled to the end-point device. If the end-point device is not coupled to any tethered communication devices, then the network authorizes a data transfer session for the end-point device over the communication path. If the end-point device is coupled to a tethered communication device, then the network denies authorization for the data transfer session over the communication path for the end-point device.

DETAILED DESCRIPTION

Figure 1:
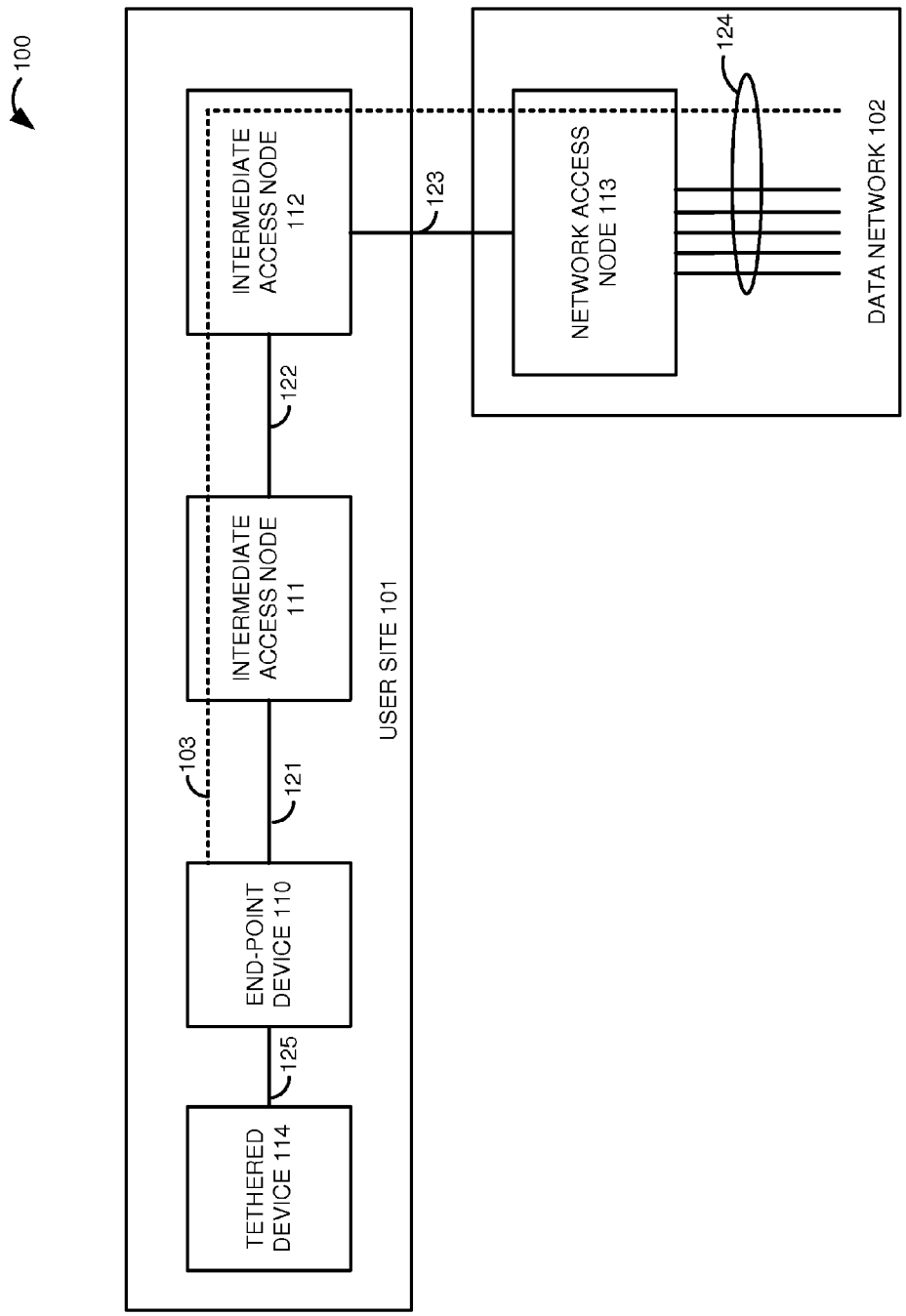
FIGS. 1-2 illustrate a communication system to secure a communication path that extends from an end-point device at a user site to an access node in a data network.
Figure 2:
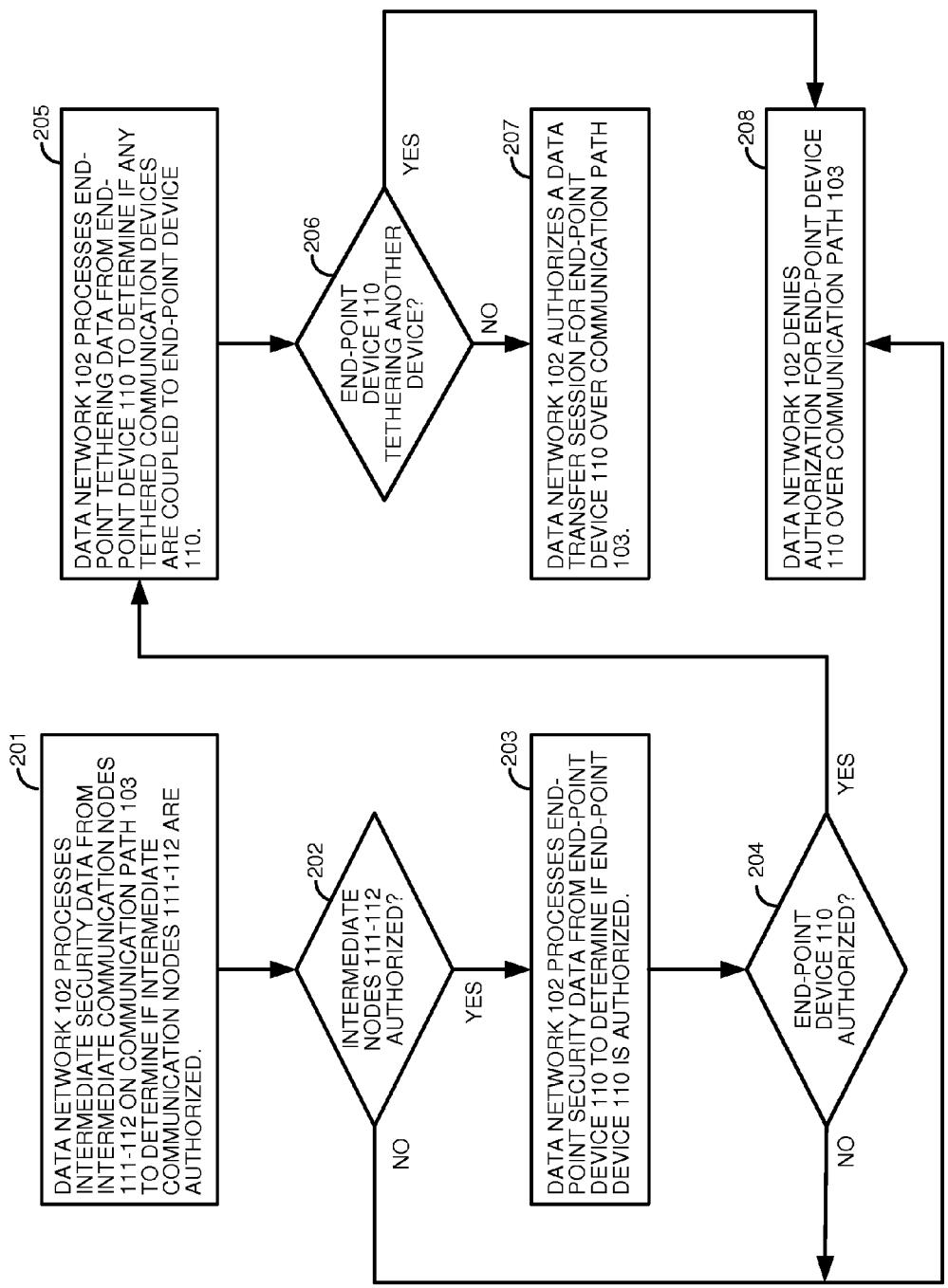
Figure 3:
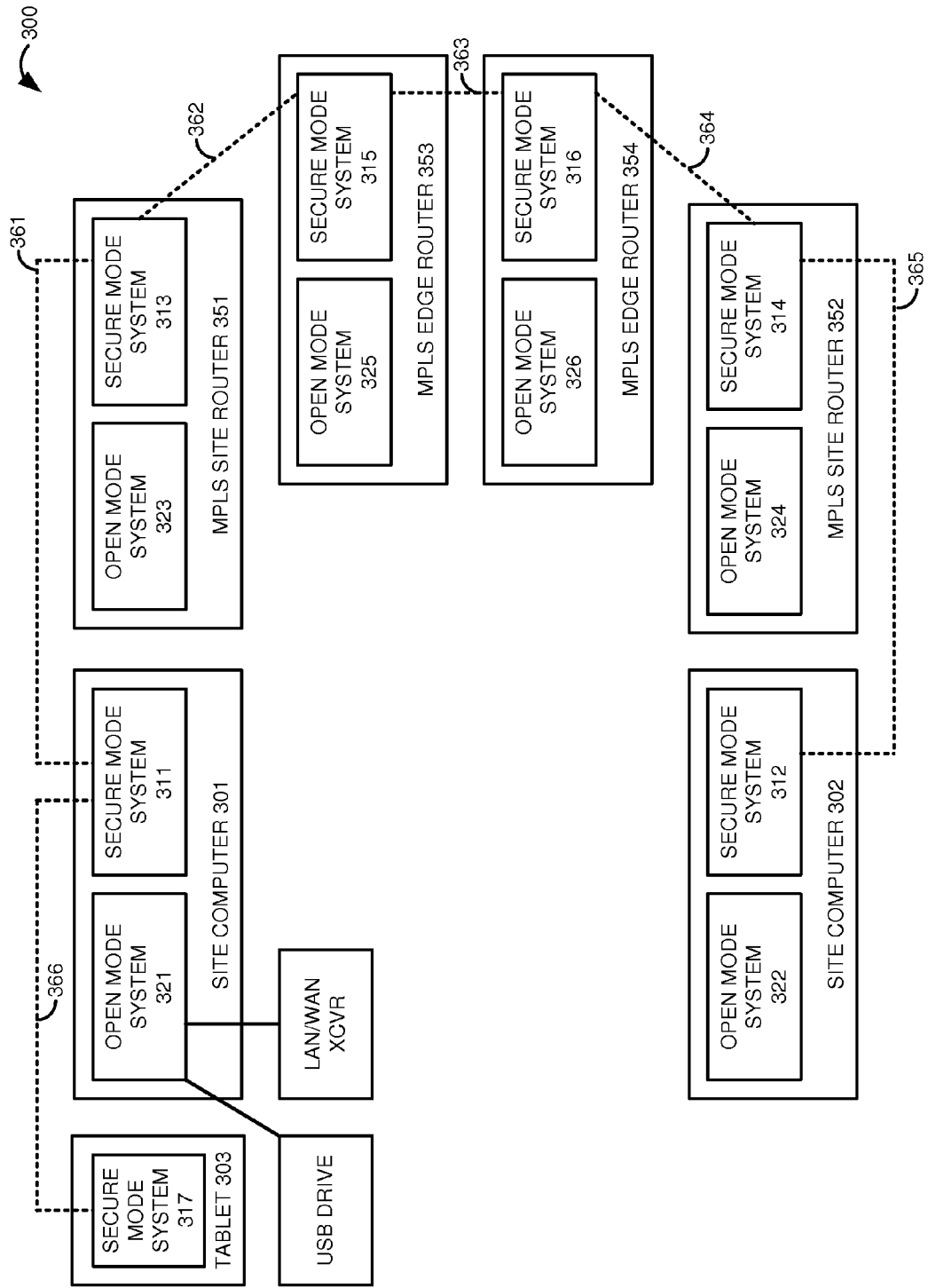
FIGS. 3-6 illustrate a Multi-Protocol Label Switching (MPLS) communication system to secure an MPLS communication path that extends from a computer through a set of MPLS routers to another computer.

FIGS. 1-2 illustrate communication system 100 to secure communication path 103 that extends from end-point device 110 at user site 101 to access node 113 in data network 102. Communication path 103 comprises: end-point device 110, intermediate access nodes 111-112, network access node 113, and communication links 121-123. Typically, communication path 103 is extended beyond network access node 113 over at least one of communication links 124 to other devices, systems, and networks. In addition, data network 102 typically has additional access nodes like network access node 113 that are coupled to communication links 124 and to other data links. Note that communication path 103 is exemplary and may have alternative architectures. For example, the number and location of the links and nodes may vary.

End-point device 110 comprises computer and communications circuitry including memory devices, software, power supplies, bus interfaces, user interfaces, and the like. Exemplary devices include phones, computers, media players, game units, and machine transceivers. The circuitry and software in end-point device 110 operate in both open and secure modes with physical separation between the two modes. To separate the open and secure modes, physically separate processors and software, time-sliced processing with context switching, or some other physical software processing isolation technique may be used. The secure mode controls and isolates the open mode, although the secure mode also services the open mode in many applications. The secure mode generally obtains control of the computer and communications circuitry before the open mode is allowed to execute. For example, the secure mode software may execute directly at start-up and manage the context switching for the open mode.

Intermediate access nodes 111-112 and network access node 113 each comprise computer and communications circuitry including memory devices, software, power supplies, bus interfaces, and the like. Exemplary devices include packet routers, wireless access points, local network interfaces, border controllers, and packet gateways. The circuitry and software in intermediate nodes 111-112 also operate in both the open mode and the secure mode with physical separation between modes.

Communication links 121-124 may use various media such as metal, glass, air/space, plastics, or some other communication interface—including combinations thereof. Communication links 121-124 may use various protocols including Ethernet, Wireless Fidelity (WiFi), Long Term Evolution (LTE), Time Division Multiplex (TDM), optical networking, Internet Protocol (IP), Multi-Protocol Label Switching (MPLS), Border Control Protocol (BGP), Session Initiation Protocol (SIP), or some other communication format—including combinations thereof.

Tethered device 114 includes communications circuitry and logic. The circuitry in tethered device 114 may or may not operate in both open and secure modes. Exemplary devices include phones, computers, memory sticks, machine transceivers, and the like. Tethered device 114 may couple to end-point device 110 over communication link 125. Communication link 125 uses a data communication protocol, such as Universal Serial Bus (USB), Near Field Communication (NFC), Wireless Fidelity (WiFi), universal Plug and Play (uPnP), Ethernet, Long Term Evolution (LTE), and the like.

Communication network 100 secures communication path 103 between end-point device 110 and network access node 113. For clarity, the following operations are discussed with data network 102 handling much of the data processing, although this data processing could be distributed among additional nodes and networks including nodes 111-112 and devices 110 and 114. Data network 102 processes intermediate security data from intermediate access nodes 111-112 on communication path 103 to determine if intermediate access nodes 111-112 are authorized. The intermediate node authorization typically happens on a per-session and per-packet basis, although another form of periodic or demand-based security scanning could be used—including combinations thereof.

In some examples, the secure mode system in intermediate access nodes 111-112 will generate and transfer the intermediate security data to data network 102. The secure mode in intermediate nodes 111-112 may use stored secret keys and other variables to generate data processing results and transfer the results as part of the intermediate security data. Access node 113 then checks the results using the variables and its own secret keys. In other examples, data network 102 transfers security challenges to the secure mode systems in intermediate access nodes 111-112 which responsively return the intermediate security data. Access node 113 could transfer random numbers to intermediate nodes 111-112, and nodes 111-112 would use their stored secret keys and the random numbers to generate and transfer data processing results as part of the intermediate security data. Access node 113 then checks the results using the random numbers and its own secret keys. Other tests to verify the secure operation of intermediate access nodes 111-112 could be used.

Data network 102 verifies the security of all intermediate nodes on communication path 103. Data network 102 may rely on physical topology databases to identify all such nodes. In some examples, data network 102 interrogates communication reporting software that executes in the secure modes of intermediate access nodes 111-112. Data network 102 may also discover the position of end-point device 110 on communication path 103 from intermediate access node 111 in this manner. Additional security authorizations may also occur for extensions of communication path 103 over communication links 124 and beyond.

If intermediate access nodes 111-112 are authorized, then data network 102 processes end-point security data from end-point device 110 to determine if end-point device 110 is authorized. The end-point device authorization typically happens on a per-session and per-packet basis, although another form of periodic or demand-based security scanning could be used —including combinations thereof. In some examples, the secure mode system in end-point device 110 generates and transfers the end-point security data to data network 102 in the manner of intermediate nodes 111-112.

In other examples, data network 102 transfers a security challenge to the secure mode system in end-point device 110 which responsively returns the end-point security data in the manner of intermediate nodes 111-112.

If end-point device 110 is authorized, then data network 102 processes end-point tethering data from end-point device 110 to determine if any tethered communication devices, such as tethered device 114, are presently coupled to end-point device 110. If end-point device 110 is not presently coupled to any tethered communication devices, then data network 102 authorizes the data transfer session for end-point device 110 over communication path 103. If data network 102 authorizes the data transfer session, then end-point device 110 exchanges data over communication path 103. In some examples, the secure mode circuitry and software in end-point device 110 generates and transfers the end-point tethering data to data network 102. In other examples, data network 102 transfers tethering queries to the secure mode system in end-point device 110 which responsively returns the end-point tethering data.

If end-point device 110 is coupled to a tethered communication device like tethered device 114, then data network 102 denies authorization for the data transfer session. End-point device 110 cannot then transfer data over communication path 103 and may be physically isolated from communication path 103 by the secure mode systems in end-point device 110 or intermediate access node 111. Signaling between the secure modes of device 110 and nodes 111-113 could implement the isolation.

During the data transfer session, data network 102 processes additional end-point tethering data to determine if any tethered communication devices like device 114 become coupled to end-point device 110. The secure mode circuitry and software in end-point device 110 could generate and transfer the additional end-point tethering data to data network 102 in response to tethering set-up within device 110. For example, the open mode system in end-point device 110 may couple to tethered device 114 over link 125, and in response, the secure mode system in end-point device 110 transfers the additional tethering data and inhibits communications between tethered device 114 and communication path 103.

In response to tethered device 114 coupling to end-point device 110, data network 102 inhibits the data transfer session for end-point device 110 over communication path 103. End-point device 110 cannot then transfer data over communication path 103 and may be physically isolated from communication path 103 by the secure mode systems in device 110 and/or node 111. Signaling between the secure modes of device 110 and nodes 111-113 could implement the isolation.

In some examples, data network 102 processes intermediate tethering data from intermediate access nodes 111-112 to determine if any tethered communication devices, such as tethered device 114, are presently coupled to intermediate access nodes 111-112. If intermediate access nodes 111-112 are not presently coupled to any tethered communication devices, such as device 114, then data network 102 will authorize the data transfer session for end-point device 110 over communication path 103. The secure mode circuitry and software in intermediate access nodes 111-112 could generate and transfer the intermediate tethering data to data network 102. In other examples, data network 102 might transfer tethering queries to the secure mode systems intermediate access nodes 111-112 which responsively return the intermediate tethering data. If any intermediate access nodes 111-112 are coupled to a tethered communication device like tethered device 114, then data network 102 denies authorization for the data transfer session. End-point device 110 cannot then transfer data over communication path 103 and the intermediate access node may be physically isolated from communication path 103 by the secure mode systems end-point device 110, intermediate access nodes 111-112, and network access node 113. Signaling between the secure modes of device 110 and nodes 111-113 could implement the isolation.

During the data transfer session, data network 102 processes additional intermediate tethering data to determine if any tethered communication device becomes coupled to intermediate access nodes 111-112. The secure mode circuitry and software in intermediate access nodes 111-112 may generate and transfers the additional intermediate tethering data to data network 102 in response to tethering set-up. For example, the open mode system in intermediate access node 111 may couple to tethered device 114, and in response, the secure mode system in intermediate access node 111 would transfer the additional tethering data. The secure mode system in intermediate access node 111 would also inhibit communications between tethered device 114 and communication path 103. In response to tethered device 114 coupling to one or more of intermediate access nodes 111-112, data network 102 inhibits the data transfer session for end-point device 110 over communication path 103.

For the data transfer session, data network 102 generates security data records indicating authorized intermediate access nodes 111-112, authorized end-point device 110, their authorization times, their authorizing systems, and other pertinent data. Data network 102 also generates conventional data usage data records characterizing the transfers including transfer amounts and times, error rates, node identifiers, device identifiers, and the like.

In a tethering situation, data network 102 generates security data records indicating the tethering host, tethered communication device 114, communication link 125, end-point device 110, intermediate access nodes 111-112, tethering time, session de-authorization time, tethering host isolation time, and tethered device isolation time. For example, network access node 113 may generate data that describes the authorization times, device IDs, and node IDs for intermediate access nodes 111-112 and end-point device 110. Later, network access node 113 may generate additional data that describes a subsequent tethering event for device 114 including the tethering time, tethering host tethered device 114, tether link 125, detection time, de-authorization time, isolation time, and the like.

In some examples, data network 102 transfers software for delivery to the secure mode system in end-point device 110. The software directs end-point device 110 to generate and transfer the end-point security data and the end-point tethering data. For example, network access node may 113 may perform a secure mode software download to end-point device 110 upon device registration with data network 102. Subsequent use of data network 102 could be restricted without the software. In some cases, end-point device 110 is already equipped with the appropriate security mode hardware, but not with the specific software to secure communication path 103 as described herein.

In some examples, end-point device 110 may become an intermediate access node, and tethered device 114 may become the end-point device. Consider that end-point device 110 is isolated from communication path 103 responsive to coupling by tethered device 114. The secure mode of end-point device 110 or nodes 111-113 might then transfer the software to the secure mode of tethered device 114. The software directs the secure mode of tethered device 114 to register with data network 102 and re-initiate the security authorization process described for communication path 103 and end-point device 110. In this example, end-point device 110 would operate like intermediate access nodes 111-112. Data network 102 would record data characterizing the tethering, isolation, software transfer, and subsequent security authorization.

Referring to FIG. 2, the operation of communication network 100 is described to secure communication path 103 between end-point device 110 and network access node 113. Data network 102 processes intermediate security data from intermediate access nodes 111-112 on communication path 103 to determine if intermediate access nodes 111-112 are authorized (201). If intermediate access nodes 111-112 are authorized (202), then data network 102 processes end-point security data from end-point device 110 to determine if end-point device 110 is authorized (203). If end-point device 110 is authorized (204), then data network 102 processes end-point tethering data from end-point device 110 to determine if any tethered communication devices, such as tethered device 114, are presently coupled to end-point device 110 (205). If end-point device 110 is not coupled to any tethered communication devices like device 114 (206), then data network 102 authorizes the data transfer session for end-point device 110 over communication path 103 (207). If intermediate access nodes 111-112 are not authorized (202), or if end-point device 110 is not authorized (204), or if any tethered communication devices are presently coupled to end-point device 110 (206), then data network 102 denies authorization for the data transfer session for end-point device 110 over communication path 103 (208). If data network 102 authorizes the data transfer session, then end-point device 110 may exchange data over communication path 103, but if data network 102 denies the authorization, then end-point device 110 is not allowed to exchange data over communication path 103.

FIGS. 3-6 illustrate Multi-Protocol Label Switching (MPLS) communication system 300 to secure an MPLS communication path that extends from site computer 301 through MPLS routers 351-354 to site computer 302. Communication system 300 is an example of communication system 100, although system 100 may use alternative configurations and operations. Communication system 300 comprises: site computers 301-302, tablet computer 303, MPLS site routers 351-352, MPLS edge routers 353-354, and secure MPLS communication links 361-366. Links 361-366 may comprise additional secure nodes and networks. The MPLS communication path comprises secure mode systems 311-316 and communication links 361-365. The MPLS communication path is associated with the Internet Protocol (IP) address pair for site computers 301-302 and an MPLS label for the communication path through MPLS routers 351-354.

Open mode systems 321-326 reside respectively within computers 301-302 and routers 351-354. Open mode systems 321-326 comprise communication and computer components like circuitry, memory, software, data, power, bus interfaces, user interfaces, and Input/Output (I/O) ports. The software and data comprise operating systems, applications, utilities, interfaces, databases, and the like.

Secure mode systems 311-316 reside respectively within computers 301-302 and routers 351-354. Note that tablet computer 303 has secure mode system 317 and may also have an open mode system. Secure mode systems 311-317 also comprise communication and computer components like circuitry, memory, software, data, power, bus interfaces, user interfaces, and I/O ports. The software and data also comprise operating systems, applications, utilities, interfaces, databases, and the like.

In this example, open mode systems 321-326 and secure mode systems 311-317 maintain physical isolation, except for secure data interfaces between the modes that are controlled by secure mode systems 311-317. In other examples, open mode systems 321-326 and secure mode systems 311-317 may share some processing resources and user interfaces under the control of secure mode systems 311-317. Secure mode system 311 may control processor access and context switching in a time-sliced processing platform that is shared with open mode system 321. Secure mode system 311 may control the physical access to memory, transceivers, sensors, and user interfaces that are shared with open mode system 321. Physical switches and/or bus interface controllers may be used to implement the secure resource sharing under the direction of secure mode systems 311-317.

Figure 4:
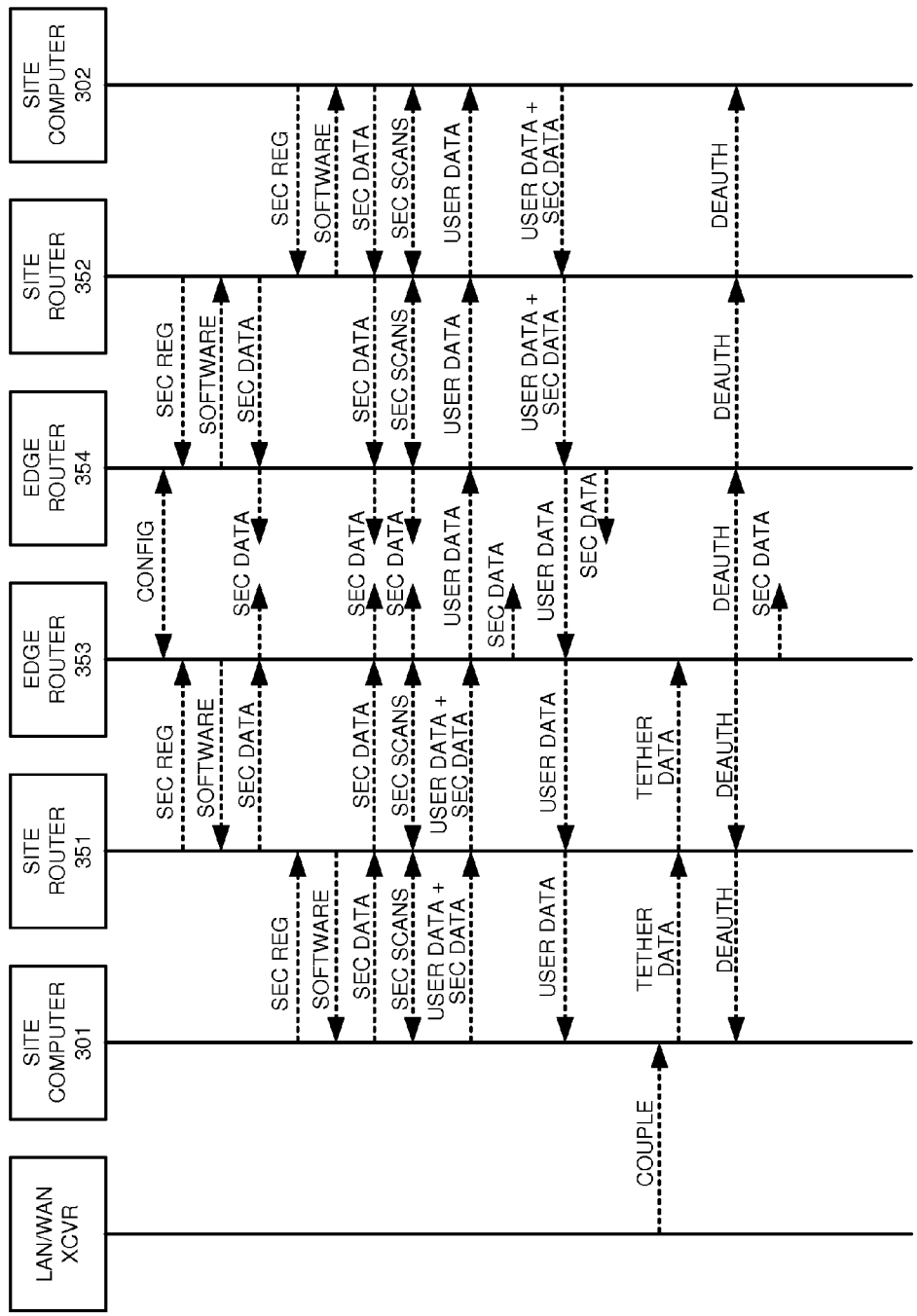

Referring to FIG. 4, edge routers 353-354 are initially configured to communicate across a secure core MPLS network. Various technologies could be used to secure the core MPLS network including the access security systems and techniques described herein. Site routers 351-352 transfer security registrations (SEC REG) to respective edge routers 353-354. The security registration transfer could be part of a site certification process and would re-occur on a periodic or on-demand basis. The security registrations include the exchange of random number challenges and corresponding hash results based on shared secret keys.

Response to the successful security registrations, edge routers 353-354 transfer security software to site routers 351-352 for use within their secure mode systems. The security software has a Time-To-Live (TTL) that is tracked by edge routers 353-354. The security software is updated periodically using the above registration process to renew the TTLs. As directed by the security software, site routers 351-352 generate and transfer security data to edge routers 353-354. Edge routers 353-354 supplement and transfer the security data to one or more management systems. The security data characterizes the security processes described herein including the authorized system, authorizing system, authorization time, authorization transaction metadata, software versions, TTLs, security tokens, hash results, and the like.

Site computers 301-302 transfer security registrations to respective site routers 351-352. The registration transfer could be part of a site certification process and would re-occur on a periodic or on-demand basis. The security registrations include the exchange of random number challenges and corresponding hash results based on shared secret keys—and the site computer registration process may extend to and include edge routers 353-354. Responsive to successful security registrations, site routers 351-352 (or edge routers 353-354) transfer security software to site computers 301-302 for use within their secure mode systems. The security software has a TTL that is tracked by routers 351-354. The security software is periodically updated using the above registration process to renew the TTLs.

As directed by the security software, site computers 301-302 generate and transfer security data to site routers 351-352 for subsequent transfer to edge routers 353-354. Site routers 351-352 and edge routers 353-354 supplement the security data for transfer to one or more management systems. The security data characterizes the security processes described above including the authorized systems, authorizing systems, authorization times, authorization transaction metadata, software versions, TTLs, security tokens, hash results, and the like.

At this point in FIG. 4, the secure mode systems of site computers 301-302, site routers 351-352, and edge routers 353-354 have established security. To maintain the security, periodic and/or on-demand security scans are performed, including security challenges, malware scans, security data reports, and security software updates. Eventually, site computer 301 transfers a data packet having user data and the IP address of site computer 302. The security software directs site computer 301 to add security data to the data packet indicating a security token and tethering information. Site computer 301 transfers the data packet to site router 351.

Site router 351 processes the security data to authorize the data packet including checking the security token and tethering data. Site router 351 adds its own security data to the packet, such as a security token and data characterizing the verification of the security token and tethering data from site computer 301. Site router 351 may add tethering data of its own. Site router 351 adds an MPLS label to the data packet and transfers the data packet to edge router 353.

Edge router 353 processes the security data to authorize the data packet including checking the security tokens and tethering data. Edge router 353 may add its own security data to the packet, such as a security token and data characterizing the verification of the security tokens and tethering data from site computer 301 and site router 351. Based on the MPLS label and/or IP address, edge router 353 transfers the packet to edge router 354. Edge router 353 also transfers the security data to one or more management systems.

A similar security registration and monitoring system is established between edge router 354, site router 352, and site computer 302. Thus, security challenges and tether detection are on-going on the MPLS communication path across site computers 301-302 and MPLS routers 351-354. Edge router 354 transfers the data packet to site router 352 based on the MPLS label and/or IP address, and site router 352 transfers the data packet to site computer 302 based on the IP address for site computer 302.

Site computer 302 responds with another data packet having more user data and the IP address of site computer 301. The security software directs site computer 302 to add security data to the data packet indicating a security token and tethering information. Site computer 302 transfers the data packet to site router 352. Site router 352 processes the security data to authorize the data packet including checking the security token and tethering data. Site router 352 adds its own security data the packet, such as a security token and data characterizing the verification of the security token and tethering data from site computer 302. Site router 352 may add tethering data of its own. Site router 352 adds the MPLS label to the data packet and transfers the data packet to edge router 354.

Edge router 354 processes the security data to authorize the data packet including checking the security token and tethering data. Edge router 354 may add its own security data to the packet, such as a security token and data characterizing the verification of the security tokens and tethering data from site computer 302 and site router 352. Based on the MPLS label, edge router 354 transfers the packet to edge router 353. Edge router 354 also transfers the security data to one or more management systems. Edge router 353 transfers the data packet to site router 351 based on the MPLS label, and site router 351 transfers the data packet to site computer 301 based on the IP address for computer 301.

A Local Area Network (LAN)/Wide Area Network (WAN) transceiver (XCVR) couples to the open mode system of site computer 301. The secure mode system in site computer 301 detects the tethered coupling by monitoring signals through a secure switch or bus interface in site computer 301 that connects the tethering communication transceiver with the open mode processing system. In response to tethering detection, site computer 301 transfers tethering data to site router 351 indicating the tethering event, tethering device, remedial actions, and the like. The secure mode system in site computer 301 activates the secure switch to isolate the tethering transceiver from the secure mode system.

Site router 351 transfers the tethering data to edge router 353 indicating the tethering event, tethering device, remedial actions, and the like. The secure mode system in site router 351 may isolate tethering site computer 301 from the secure mode system of site router 351. Edge router 353 generates and transfers de-authorization messages for the communication path to the secure mode systems in routers 351, 352, 354, and in computers 301-302. Edge router 353 generates and transfers security data for the tethering event to one or more management systems indicating the tethering event, tethering devices, remedial actions, and the like.

Figure 5:
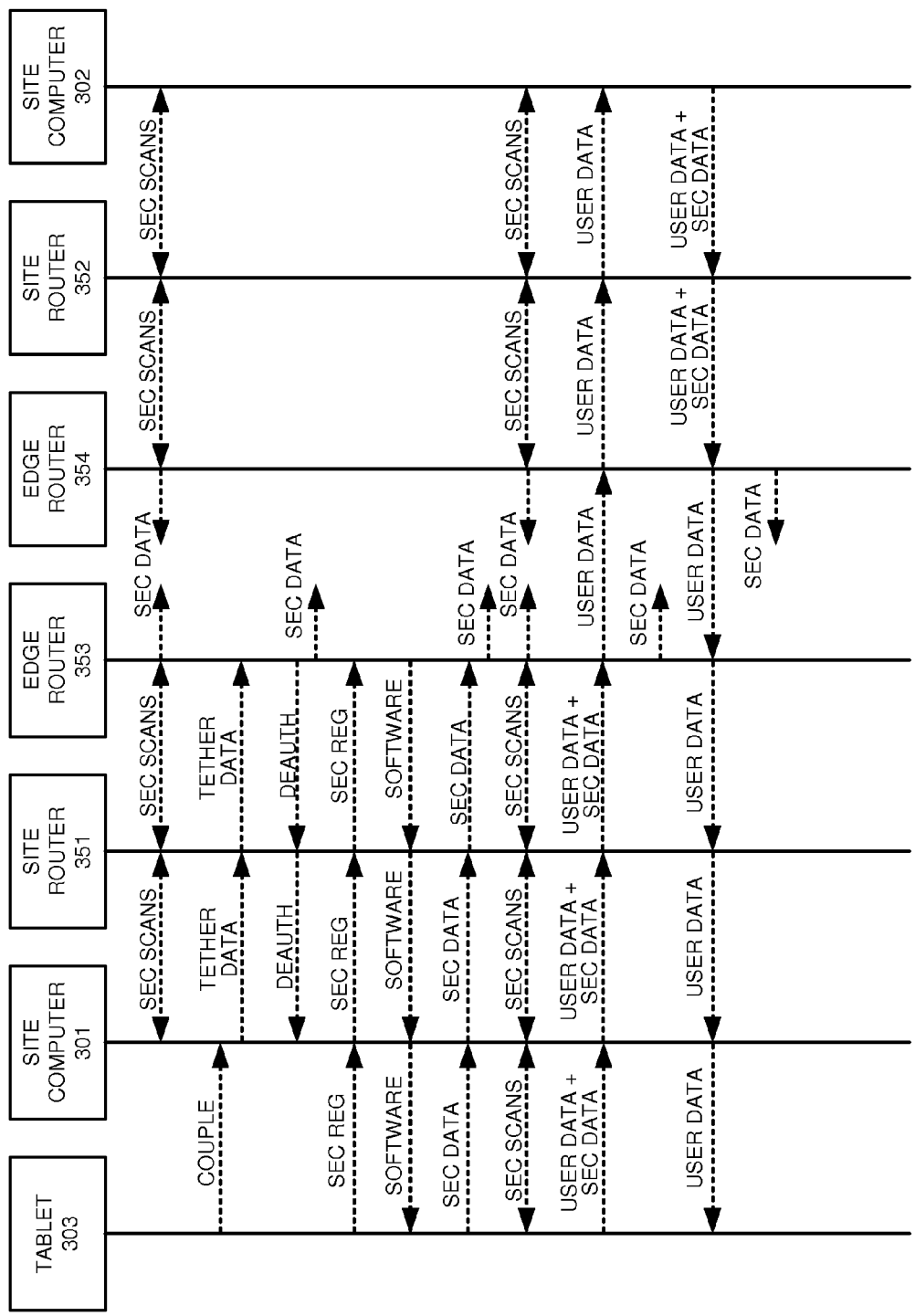

Referring to FIG. 5, the discussion continues with a scenario occurring after the secure mode systems of computers 301-302 and routers 351-354 are secured. To maintain this security, periodic and/or on-demand security scans are being performed including security challenges, malware scans, security data reports, and security software updates. Tablet computer 303 then couples to the open mode system of site computer 301. The secure mode system in site computer 301 detects the tethered coupling by monitoring signals through its secure switch that connects the tethering communication transceiver with the open mode processing system. In response to tethering detection, site computer 301 transfers tethering data to site router 351 indicating the tethering event, tethering device, remedial actions, and the like. The secure mode system in site computer 301 activates the transceiver switch to isolate the tethering transceiver from its secure mode system. The secure mode system in site router 351 may isolate tethering site computer 301 from the secure mode system of site router 351.

Site router 351 transfers the tethering data to edge router 353 indicating the tethering event, tethering device, remedial actions, and the like. Edge router 353 generates and transfers de-authorization messages for site computer 301 to the secure mode systems in router 351 and computer 301. Edge router 353 generates and transfers security data for the tethering event to one or more management systems indicating the tethering event, tethering devices, remedial actions, and the like.

Responsive to the tethering, the secure mode system in tablet computer 303 transfers a secure tether registration to the secure mode system in site computer 301. The secure tether registration includes an exchange of random number challenges and corresponding hash results based on shared secret keys—and the tether registration process extends to routers 351 and 353. Responsive to successful tether registration, edge router 353 transfers security software to tablet computer 303 for use in its secure mode system. The security software has a TTL that is tracked by routers 351 and 353. The security software is periodically updated using the above registration process to renew the TTLs.

As directed by the security software, tablet computer 303 generates and transfers security data to site computer 301 for subsequent transfer to edge routers 351 and 353. Routers 351 and 353 supplement the security data for transfer to one or more management systems. The security data characterizes the security processes described above including the authorized systems, authorizing systems, authorization times, authorization transaction metadata, software versions, TTLs, security tokens, hash results, and the like. Periodic and/or on-demand security scans are performed including security challenges, security data reports, and security software updates.

Tablet computer 303 then transfers a data packet having user data and the IP address of site computer 302. The security software directs tablet computer 303 to add security data to the data packet indicating a security token and tethering information. Tablet computer 303 transfers the data packet to site computer 301. Site computer 301 processes the security data to authorize the data packet including checking the security token and tethering data. Site computer 301 adds its own security data to the packet, such as a security token and data characterizing the verification of the security token for computer 303 and tethering data for computer 301. Site computer 301 transfers the packet to site router 351.

Site router 351 processes the security data to authorize the data packet including checking the security token and tethering data. Site router 351 adds its own security data the packet, such as a security token and data characterizing the verification of the security token and tethering data from site computer 301. Site router 351 adds an MPLS label to the data packet and transfers the packet to edge router 353 based on the IP address.

Edge router 353 processes the security data to authorize the data packet including checking the security tokens and tethering data. Edge router 353 may add its own security data the packet, such as a security token and data characterizing the verification of the security tokens and tethering data from site computer 301 and site router 351. Based on the MPLS label and/or IP address, edge router 353 transfers the packet to edge router 354. Edge router 353 also transfers the security data to one or more management systems. Edge router 354 transfers the data packet to site router 352 based on the MPLS label and/or IP address, and site router 352 transfers the data packet to site computer 302 based on the IP address for computer 302.

Site computer 302 responds with a data packet having more user data and the IP address of tablet computer 303. The security software directs site computer 302 to add security data to the data packet indicating a security token and tethering information. Site computer 302 transfers the data packet to site router 352. Site router 352 processes the security data to authorize the data packet including checking the security token and tethering data. Site router 352 adds its own security data the packet, such as a security token and data characterizing the verification of the security token and tethering data from site computer 302. Site router 352 adds the MPLS label to the data packet and transfers the data packet to edge router 354.

Edge router 354 processes the security data to authorize the data packet including checking the security token and tethering data. Edge router 354 may add its own security data to the packet, such as a security token and data characterizing the verification of the security tokens and tethering data from site computer 302 and site router 352. Based on the MPLS label, edge router 354 transfers the packet to edge router 353. Edge router 354 also transfers the security data to one or more management systems. Edge router 353 transfers the data packet to site router 351 based on the MPLS label, and site router 351 transfers the data packet to site computer 301 for delivery to tablet computer 303 based on the IP address for computer 303.

Figure 6:
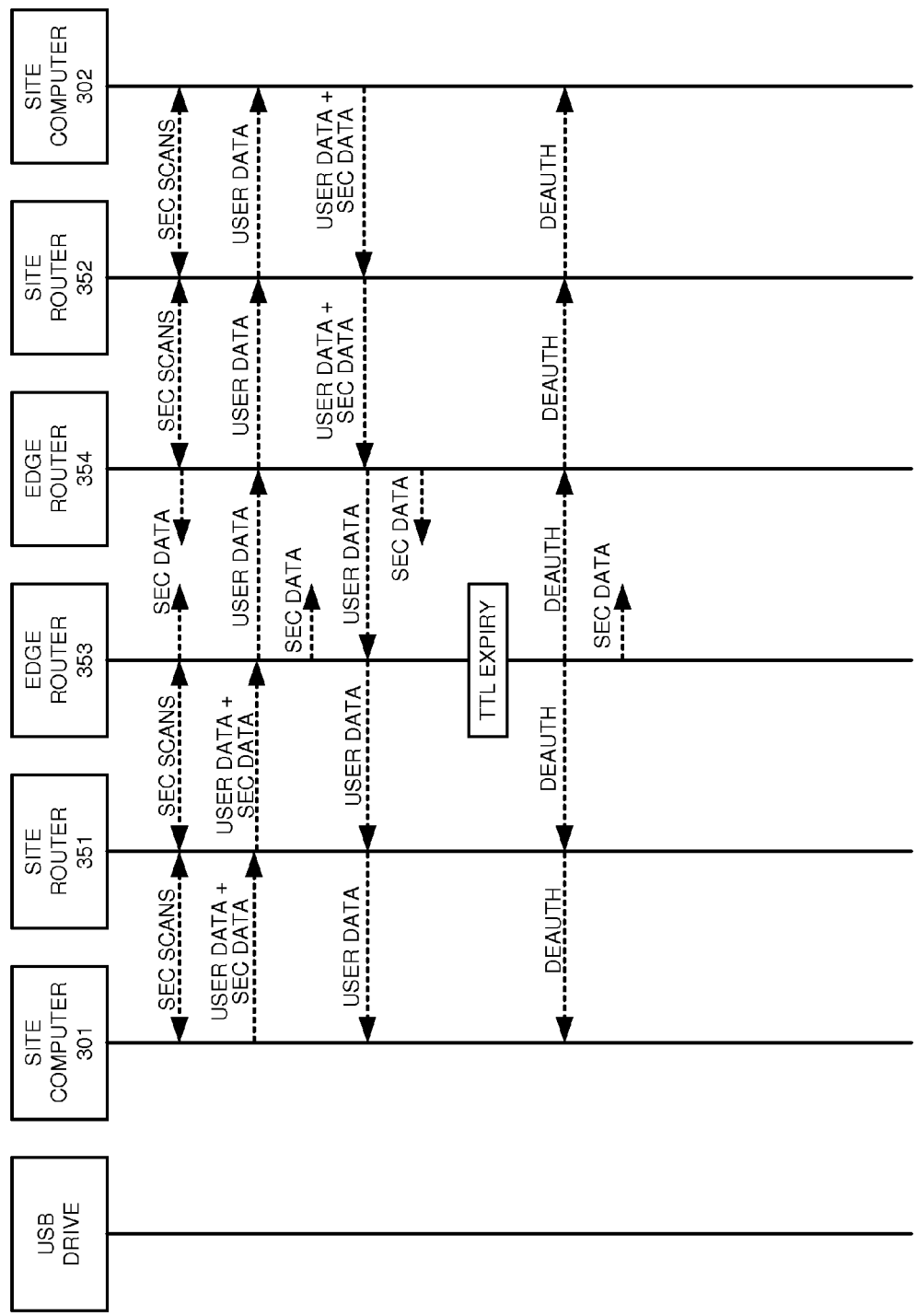

Referring to FIG. 6, the discussion continues with another scenario where the secure mode systems of site computers 301-302, site routers 351-352, and edge routers 353-354 have established security. Part of the security is for edge router 353 to track the expiry of various security authorization TTLs for routers, links, computers, software versions, communication paths, MPLS labels, IP address pairs, and tethered communications. Periodic and/or on-demand security scans are performed, including security challenges, malware scans, security data reports, and security software updates.

Eventually, site computer 301 transfers a data packet having user data and the IP address of site computer 302. The security software directs site computer 301 to add security data to the data packet indicating a security token and tethering information. Site computer 301 transfers the data packet to site router 351. Site router 351 processes the security data to authorize the data packet including checking the security token and tethering data. Site router 351 adds its own security data the packet, such as a security token and data characterizing the verification of the security token and tethering data from site computer 301. Site router 351 may add tethering data of its own. Site router 351 adds an MPLS label to the data packet and transfers the data packet to edge router 353.

Edge router 353 processes the security data to authorize the data packet including checking the security tokens and tethering data. Edge router 353 may add its own security data to the packet, such as a security token and data characterizing the verification of the security tokens and tethering data from site computer 301 and site router 351. Based on the MPLS label and/or IP address, edge router 353 transfers the packet to edge router 354. Edge router 353 also transfers the security data to one or more management systems.

A similar security registration and monitoring system is established between edge router 354, site router 352, and site computer 302. Thus, security challenges and tether detection are on-going on the MPLS communication path across site computers 301-302 and MPLS routers 351-354. Edge router 354 transfers the data packet to site router 352 based on the MPLS label and/or IP address, and site router 352 transfers the data packet to site computer 302 based on the IP address for site computer 302.

Site computer 302 responds with another data packet having more user data and the IP address of site computer 301. The security software directs site computer 302 to add security data to the data packet indicating a security token and tethering information. Site computer 302 transfers the data packet to site router 352. Site router 352 processes the security data to authorize the data packet including checking the security token and tethering data. Site router 352 adds its own security data the packet, such as a security token and data characterizing the verification of the security token and tethering data from site computer 302. Site router 352 may add tethering data of its own. Site router 352 adds the MPLS label to the data packet and transfers the data packet to edge router 354.

Edge router 354 processes the security data to authorize the data packet including checking the security token and tethering data. Edge router 354 may add its own security data to the packet, such as a security token and data characterizing the verification of the security tokens and tethering data from site computer 302 and site router 352. Based on the MPLS label, edge router 354 transfers the packet to edge router 353. Edge router 354 also transfers the security data to one or more management systems. Edge router 353 transfers the data packet to site router 351 based on the MPLS label, and site router 351 transfers the data packet to site computer 301 based on the IP address for computer 301.

Edge router 353 detects the expiry for one of the TTLs. For example, the TTL for the communication path authorization may have expired. In another example, the TTL for a tethering authorization may have expired. Edge router 353 generates and transfers de-authorization messages for the given TTL: router, link, computer, software version, communication path, MPLS label, IP address pair, and/or tethered communication—including combinations thereof. The de-authorization messages include isolation instructions based on the given TTL expiry. Edge router 353 generates and transfers security data for the TTL expiry event to one or more management systems indicating the TTL event, remedial actions, and the like.

Figure 7:
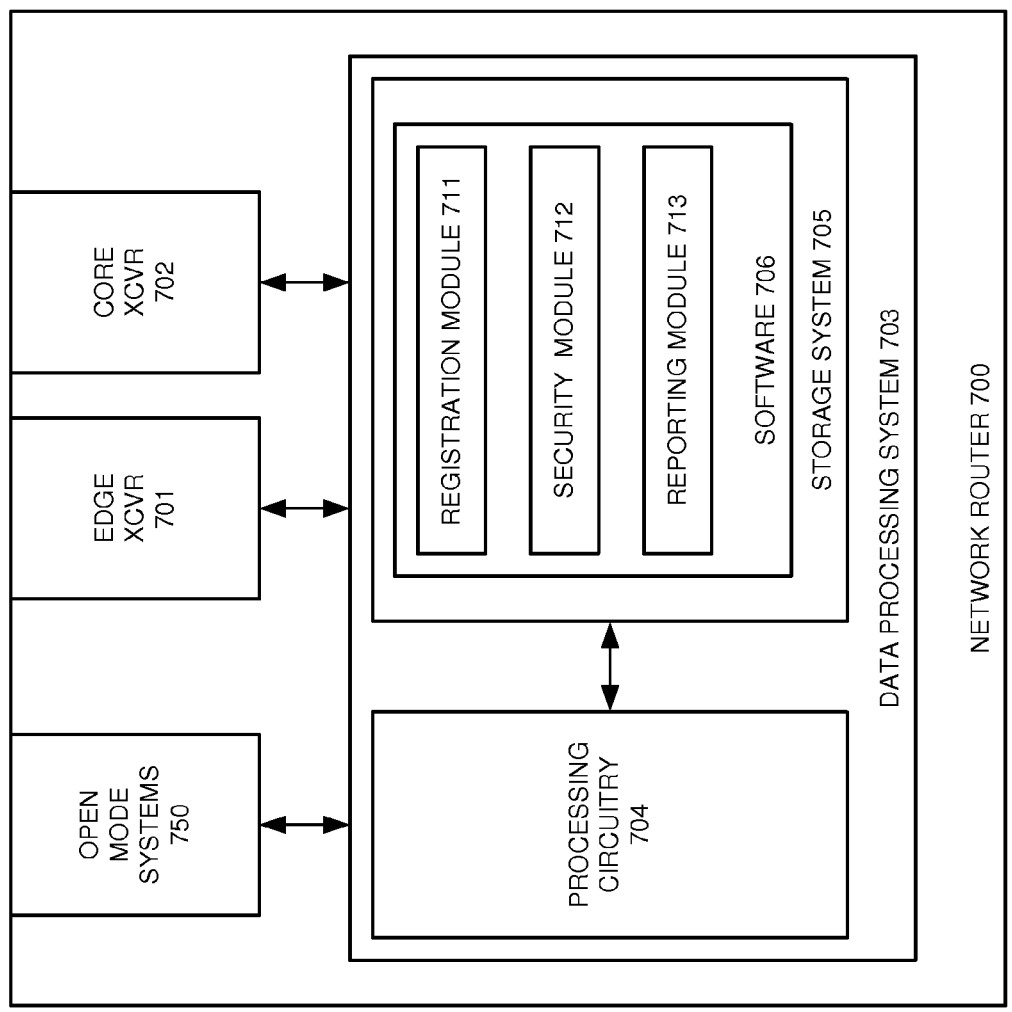
FIG. 7 illustrates a network router to secure a communication path that extends from an end-point device to the network router.

FIG. 7 illustrates network router 700 to secure a communication path that extends from an end-point device to network router 700. Network router 700 is an example of network access node 113 and edge MPLS routers 353-354, although these systems may use alternative configurations and operations. Network router 700 includes open mode systems 750 including circuitry, memory, software, bus interfaces, and the like. Network router 700 also comprises edge system transceiver 701 and core network transceiver 702. Communication transceivers 701-702 comprise communication components, such as ports, amplifiers, filters, modulators, signal processors, and the like. Communication transceivers 701-702 transfer security data and user data as described herein.

Network router 700 comprises data processing system 703 which forms a portion of the secure mode system in router 700. Processing system 703 comprises processing circuitry 704 and storage system 705. Storage system 705 stores software 706. Software 706 includes software modules 711-713. Some conventional aspects of network router 700 are omitted for clarity, such as power supplies, enclosures, and the like. Network router 700 may be centralized or distributed and may include various virtualized components.

In data processing system 703, processing circuitry 704 comprises circuit boards, integrated circuitry, and associated electronics. Storage system 705 comprises non-transitory, machine-readable, data storage media, such as flash drives, disc drives, memory circuitry, servers, and the like. Software 706 comprises machine-readable instructions that control the operation of processing circuitry 704 when executed. Software 706 includes software modules 711-713 and may also include operating systems, applications, data structures, virtual machines, utilities, databases, and the like. All or portions of software 706 may be externally stored on one or more storage media, such as flash drives, discs, servers, and the like.

When executed by processing circuitry 704, registration module 711 directs circuitry 704 to receive and process security registrations and distribute security software. When executed by processing circuitry 704, security module 712 directs circuitry 704 to receive and process security data and TTLs to authorize and de-authorize various devices, nodes, and communication paths. When executed by processing circuitry 704, reporting module 713 directs circuitry 704 to generate and transfer security data indicating registrations, authorizations, tethering events, TTL events, and the like.

Figure 8:
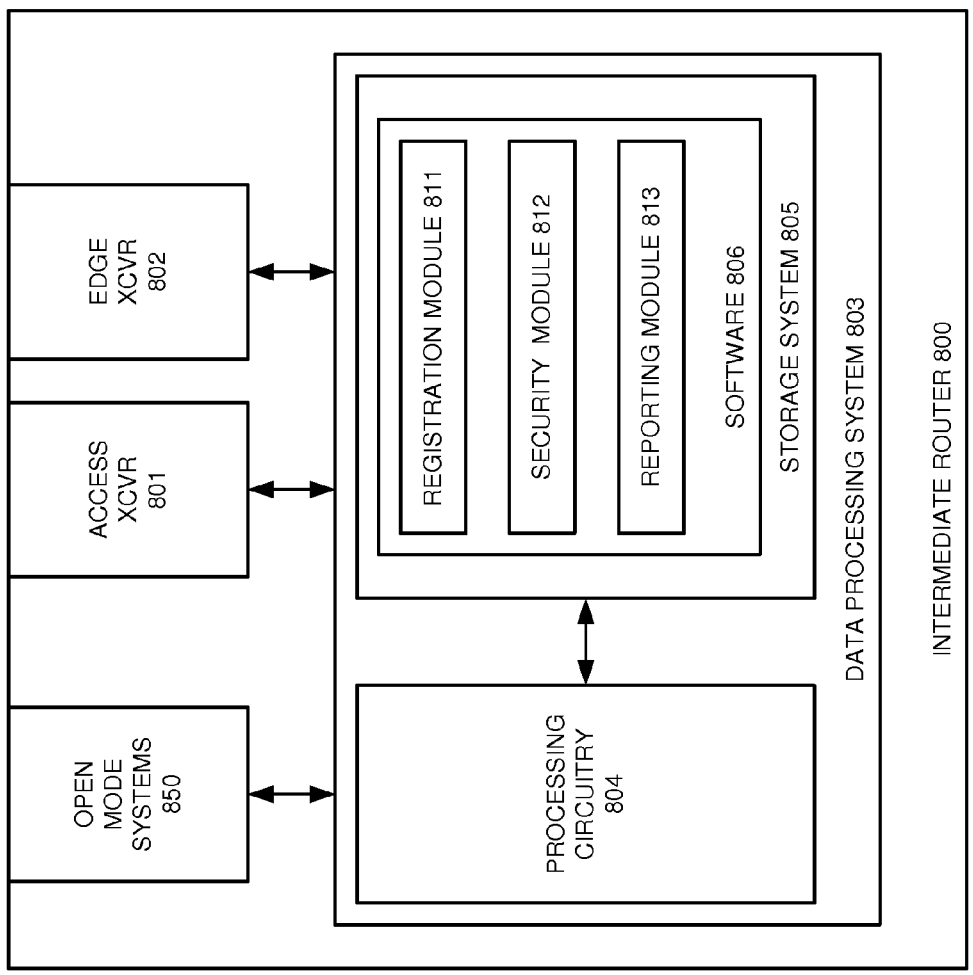
FIG. 8 illustrates an intermediate router to secure a communication path that extends from an end-point device to a network router through the intermediate router.

FIG. 8 illustrates intermediate router 800 to secure a communication path that extends from an end-point device to a network router through intermediate router 800. Intermediate router 800 is an example of intermediate access nodes 111-112 and site MPLS routers 351-352, although these systems may use alternative configurations and operations. Intermediate router 800 includes open mode systems 850 including circuitry, memory, software, bus interfaces, and the like. Intermediate router 800 also comprises access system transceiver 801 and edge network transceiver 802. Communication transceivers 801-802 comprise communication components, such as ports, amplifiers, filters, modulators, signal processors, and the like. Communication transceivers 801-802 transfer security data and user data as described herein.

Intermediate router 800 comprises data processing system 803 which forms a portion of the secure mode system in router 800. Processing system 803 comprises processing circuitry 804 and storage system 805. Storage system 805 stores software 806. Software 806 includes software modules 811-813. Some conventional aspects of intermediate router 800 are omitted for clarity, such as power supplies, enclosures, and the like. Intermediate router 800 may be centralized or distributed and may include various virtualized components. In data processing system 803, processing circuitry 804 comprises circuit boards, integrated circuitry, and associated electronics. Storage system 805 comprises non-transitory, machine-readable, data storage media, such as flash drives, disc drives, memory circuitry, servers, and the like. Software 806 comprises machine-readable instructions that control the operation of processing circuitry 804 when executed. Software 806 includes software modules 811-813 and may also include operating systems, applications, data structures, virtual machines, utilities, databases, and the like. All or portions of software 806 may be externally stored on one or more storage media, such as flash drives, discs, servers, and the like.

When executed by processing circuitry 804, registration module 811 directs circuitry 804 to receive and process security registrations and distribute security software. When executed by processing circuitry 804, security module 812 directs circuitry 804 to receive and process security data and TTLs to authorize and de-authorize various devices, nodes, and communication paths. When executed by processing circuitry 804, reporting module 813 directs circuitry 804 to generate and transfer security data indicating registrations, authorizations, tethering events, TTL events, and the like.

Figure 9:
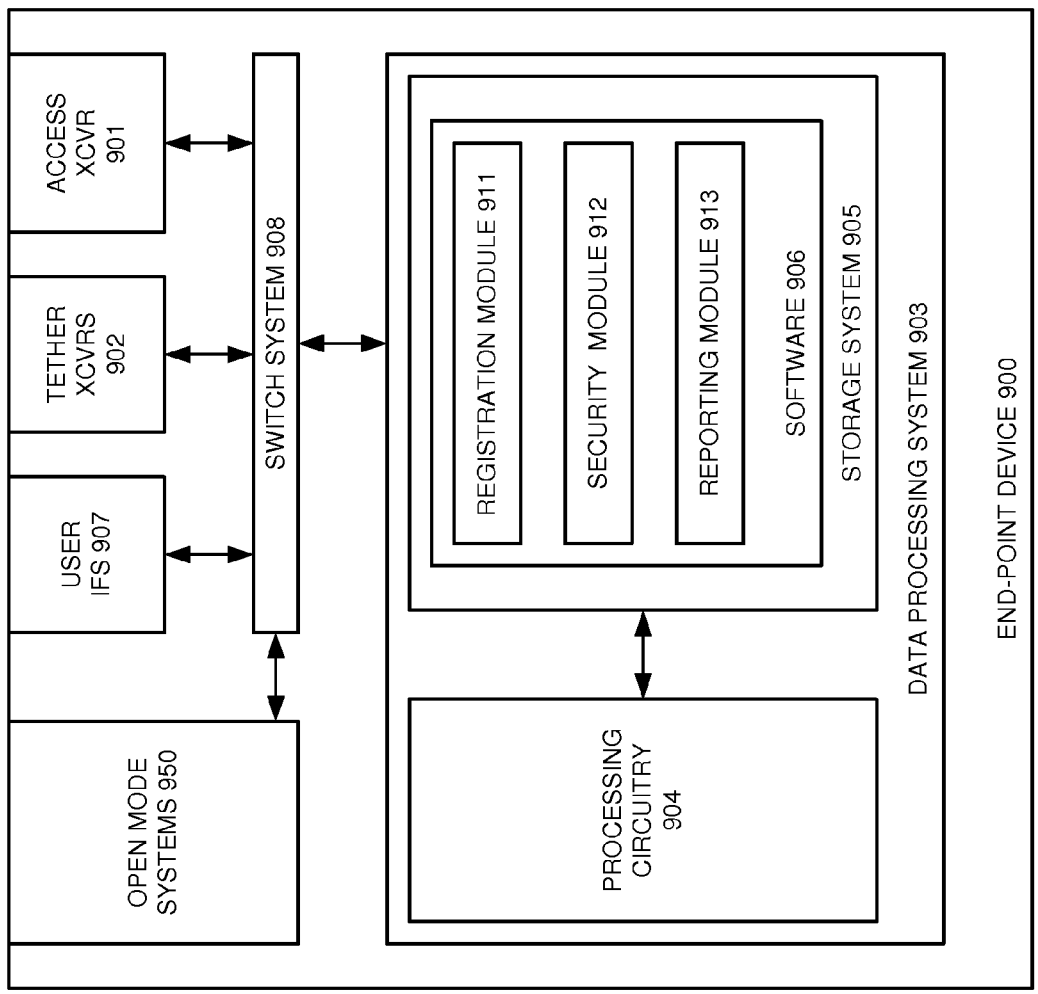
FIG. 9 illustrates an end-point device to secure a communication path that extends from the end-point device to a network router.

FIG. 9 illustrates end-point device 900 to secure a communication path that extends from end-point device 900 to a network router. End-point device 900 is an example of end-point device 110, site computers 301-302, tablet computer 303, and perhaps tethered device 114, although these devices may use alternative configurations and operations.

End-point device 900 comprises access system transceiver 901 and tether transceivers 902. Communication transceivers 901-902 comprise communication components, such as antennas, ports, amplifiers, filters, modulators, signal processors, and the like. Communication transceivers 901-902 transfer security data and user data as described herein.

End-point device 900 comprises data processing system 903 and switch system 908 which form a portion of the secure mode system in device 900. End-point device 900 also comprises open mode systems 950 including circuitry, memory, software, bus interfaces, and the like. End-point device 900 comprises user interfaces 907 such as touch screen displays, control buttons, microphones, cameras, sensors, speakers, and the like.

Data processing system 903 comprises processing circuitry 904 and storage system 905. Storage system 905 stores software 906. Software 906 includes software modules 911-913. Some conventional aspects of intermediate router 900 are omitted for clarity, such as power supplies, enclosures, and the like. Intermediate router 900 may be centralized or distributed and may include various virtualized components. In data processing system 903, processing circuitry 904 comprises circuit boards, integrated circuitry, and associated electronics. Storage system 905 comprises non-transitory, machine-readable, data storage media, such as flash drives, disc drives, memory circuitry, servers, and the like. Software 906 comprises machine-readable instructions that control the operation of processing circuitry 904 when executed. Software 906 includes software modules 911-913 and may also include operating systems, applications, data structures, virtual machines, utilities, databases, and the like. All or portions of software 906 may be externally stored on one or more storage media, such as flash drives, discs, servers, and the like.

Switch system 908 comprises electrically controlled circuitry to route and monitor signals between device components. Exemplary switch systems include Digital Signal Processors (DSPs), bus interface controllers, transistor arrays, and the like. Switch system 908 monitors signals between open systems 950 and user interfaces 907 and tether transceivers 902 for activity. If the signals reveal a tethering attempt, then switch system 908 notifies (security module 912 in) processing system 903. Switch system 908 isolates access transceiver 901 and data processing system 903 from open mode systems 950, tethering transceivers 902, and user interfaces 907.

When executed by processing circuitry 904, registration module 911 directs circuitry 904 to receive and process security registrations and download security software. When executed by processing circuitry 904, security module 912 directs circuitry 904 to generate security data for authorization and de-authorization. Security module 912 also directs circuitry 904 to interact with switch system 908 to monitor tethering signals and isolate systems as needed. When executed by processing circuitry 904, reporting module 913 directs circuitry 904 to generate and transfer security data indicating registrations, authorizations, tethering events, TTL events, and the like.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication network to secure a communication path comprising a network access node, one or more intermediate access nodes, and an end-point device, the method comprising:

processing intermediate security data from the one or more intermediate access nodes on the communication path to determine if the one or more intermediate access nodes are authorized;

if the one or more intermediate access nodes are authorized, then processing end-point security data from the end-point device to determine if the end-point device is authorized;

if the end-point device is authorized, then processing end-point tethering data from the end-point device to determine if any tethered communication devices are coupled to the end-point device and if the end-point device is not coupled to any of the tethered communication devices, then authorizing a data transfer session for the end-point device over the communication path;

if the end-point device is coupled to any of the tethered communication devices, then denying authorization for the data transfer session for the end-point device over the communication path;

processing additional end-point tethering data during the data transfer session to determine if any of the tethered communication devices become coupled to the end-point device, and in response to one of the tethered communication devices coupling to the end-point device, inhibiting the data transfer session for the end-point device over the communication path; and processing intermediate tethering data during the data transfer session to determine if any of the tethered communication devices become coupled to any of the authorized intermediate access nodes on the communication path, and in response to one of the tethered communication devices coupling to one of the authorized intermediate access nodes, inhibiting the data transfer session for the authorized end-point device over the communication path.

2. The method of claim 1 further comprising generating security data records indicating the authorized ones of the intermediate access nodes, the authorized end-point device, their authorization times, the one of the tethered communication devices that couples to the authorized end-point device if any, an end-point coupling time if any, and a data transfer session inhibition time if any.

3. The method of claim 1 further comprising generating additional security data records indicating the one of the tethered communication devices that couples to the authorized one of the intermediate access nodes if any, the authorized one of the intermediate access nodes that couples to the one of the tethered communication devices if any, an intermediate node coupling time if any, and the data transfer session inhibition time if any.

4. The method of claim 1 further comprising transferring software for delivery to the end-point device to direct the end-point device to generate and transfer the end-point security data and the end-point tethering data.

5. The method of claim 4 wherein:
the software is configured for execution within a secure mode system in the end-point device that is physically separated from an open mode system in the end-point device; and
transferring the software comprises transferring the software over a secure communication link to the secure mode system in the end-point device.

6. The method of claim 5 wherein the software is configured to direct the secure mode system in the end-point device to detect if any of the tethered communication devices become coupled to the open mode system in the end-point device.

7. The method of claim 1 wherein the tethered communication devices comprise at least one of an Ethernet device, Wireless Fidelity (WiFi) device, Long Term Evolution (LTE) device, Universal Serial Bus (USB) device, and Near Field Communication (NFC) device.

8. The method of claim 1 wherein the communication path comprises a Multi-Protocol Label Switched (MPLS) communication path.

9. A communication network to secure a communication path comprising a network access node, one or more intermediate access nodes, and an end-point device, the communication network comprising:
the network access node configured to process intermediate security data from the one or more intermediate access nodes on the communication path to determine if the one or more intermediate access nodes are authorized;
the intermediate access nodes are configured to process end-point security data from the end-point device to determine if the end-point device is authorized;
the end-point device is configured to process tethering data to determine if any tethered communication devices are coupled to the end-point device; and
the network access node is configured to authorize a data transfer session for the end-point device over the communication path if the end-point device is not coupled to any of the tethered communication devices and to deny authorization for the data transfer session for the end-point device over the communication path if the end-point device is coupled to any of the tethered communication devices
the end-point device is configured to process additional end-point tethering data during the data transfer session to determine if any of the tethered communication devices become coupled to the end-point device and in response to one of the tethered communication devices coupling to the end-point device, to inhibit the data transfer session over the communication path; and
the intermediate access nodes are configured to process intermediate tethering data during the data transfer session to determine if any of the tethered communication devices become coupled to any of the authorized intermediate access nodes on the communication path, and in response to one of the tethered communication devices coupling to one of the authorized intermediate access nodes, to inhibit the data transfer session for the authorized end-point device over the communication path.

10. The communication network of claim 9 wherein the network access node is configured to generate security data records indicating the authorized ones of the intermediate access nodes, the authorized end-point device, their authorization times, the one of the tethered communication devices that couples to the authorized end-point device if any, an end-point coupling time if any, and a data transfer session inhibition time if any.

11. The communication network of claim 9 wherein the network access node is configured to generate security data records the one of the tethered communication devices that couples to the authorized one of the intermediate access nodes if any, the authorized one of the intermediate access nodes that couples to the one of the tethered communication devices if any, an intermediate node coupling time if any, and the data transfer session inhibition time if any.

12. The communication network of claim 9 wherein the network access node is configured to transfer software for delivery to the end-point device to direct the end-point device to generate and transfer the end-point security data and the end-point tethering data.

13. The communication network of claim 12 wherein the software is configured for execution within a secure mode system in the end-point device that is physically separated from an open mode system in the end-point device and is transferred over a secure communication link to the secure mode system in the end-point device.

14. The communication network of claim 13 wherein the software is configured to direct the secure mode system in the end-point device to detect if any of the tethered communication devices become coupled to the open mode system in the end-point device.

15. The communication network of claim 9 wherein the tethered communication devices comprise at least one of an Ethernet device, Wireless Fidelity (WiFi) device, Long Term Evolution (LTE) device, Universal Serial Bus (USB) device, and Near Field Communication (NFC) device.

16. The communication network of claim 9 wherein the communication path comprises a Multi-Protocol Label Switched (MPLS) communication path.

\* \* \* \* \*